United States Patent [19]
Freeman

[11] 4,261,635
[45] Apr. 14, 1981

[54] OPTICAL APPARATUS

[75] Inventor: Michael H. Freeman, Clwyd, Wales

[73] Assignee: Pilkington P. E. Limited, St. Helens, United Kingdom

[21] Appl. No.: 35,243

[22] Filed: May 2, 1979

[30] Foreign Application Priority Data

May 16, 1978 [GB] United Kingdom ............... 19715/78
Apr. 5, 1979 [GB] United Kingdom ............... 11995/79

[51] Int. Cl.³ .................................................. G02B 5/32
[52] U.S. Cl. ................................ 350/3.72; 350/3.70
[58] Field of Search ................ 350/3.7, 3.72, 45, 54

[56] References Cited

U.S. PATENT DOCUMENTS

| | | | |
|---|---|---|---|
| 3,915,548 | 10/1975 | Opittek et al. | 350/3.72 |
| 3,940,204 | 2/1976 | Withrington | 350/3.72 |
| 4,218,111 | 8/1980 | Withrington et al. | 350/3.72 |

Primary Examiner—John K. Corbin
Assistant Examiner—Bruce Y. Arnold
Attorney, Agent, or Firm—Mattern, Ware, Davis & Stoltz

[57] ABSTRACT

Optical apparatus, such as head-up display apparatus, for superimposing visual information on an observer's view of a scene or object comprises a substantially flat transmission hologram through which the observer views the scene or object, the hologram being disposed substantially orthogonally to and midway along an axis between the observer's eye position and projection optics so as to deviate light from an image produced by the projection optics to the observer's eye position with minimal field aberrations.

5 Claims, 1 Drawing Figure

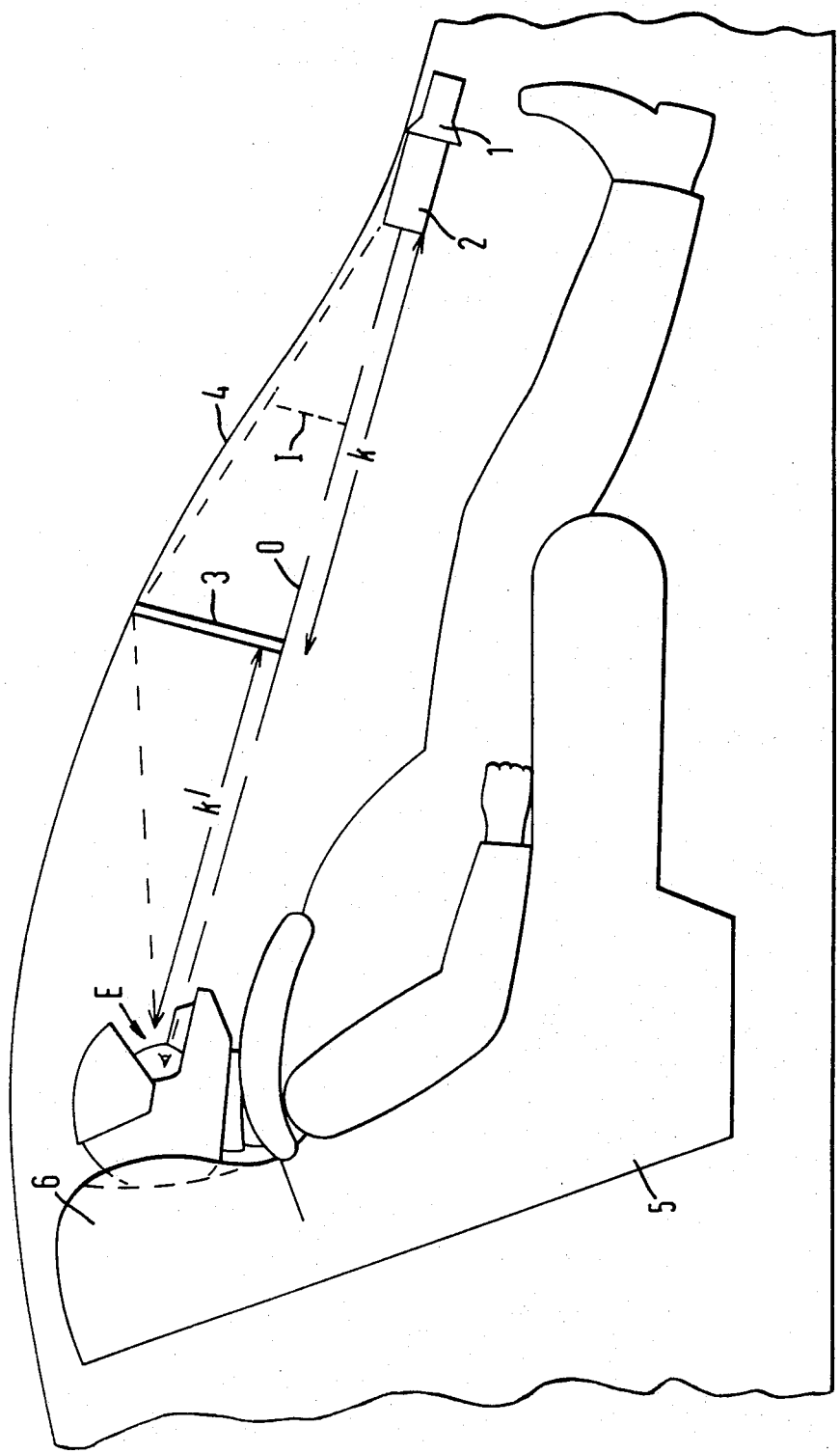

OPTICAL APPARATUS

This invention concerns improvements in or relating to optical apparatus, and relates more particularly to optical apparatus for superimposing displayed visual information on an observer's view of a scene or object, and especially to head-up display apparatus.

Head-up display apparatus commonly comprises a combiner through which an observer, usually the pilot of an aircraft, views the outside scene and by means of which displayed visual information is superimposed on that view through light incident on the combiner from a display source and deviated by the combiner to travel to the observer's eyes. Normally the light reaching the observer's eyes is collimated so that he sees an image at infinity of the displayed information thus avoiding the need for re-focussing of his eyes relative to his view of the outside scene, which is usually distant and therefore also effectively at infinity.

It has previously been proposed to use hologram optics in the combiner, and in particular to use a transmissive holographic lens which the observer views the outside scene and which receives light from projection optics associated with a display source and collimates and deviates such light transmitted through the holographic lens to direct it to the observer's eyes. The projection optics produces an image of visual information displayed by the display source in an image plane located between the holographic lens and the projection optics, and the holographic lens receives light from that image.

In order to obtain as large a field of view as possible the combiner must have minimum field aberrations. The most serious of these is astigmatism as this is not reduced by the limitation on the observed light beams caused by the small size of the pupils of the observer's eyes relative to the size of the combiner, head position envelope, etc.

According to the present invention there is provided optical apparatus for superimposing displayed visual information on an observer's view of a scene or object, comprising a display source, projection optics arranged to produce in an image plane an image of visual information displayed by the display source, and a transmission hologram arranged to receive light from that image and deviate such light towards the observer's eye position, while the observer views said scene or object through the transmission hologram, wherein the transmission hologram is substantially flat and is disposed in a plane substantially orthogonal to an axis extending from the observer's eye position to the projection optics at a location substantially mid-way along that axis such that the distance between the projection optics and the transmission hologram is substantially the same as the distance between the transmission hologram and the observer's eye position.

More particularly the present invention provides head-up display apparatus comprising a display source, projection optics arranged to produce in an image plane an image of visual information displayed by the display source, and a combiner arranged to receive light from that image and direct such light to an observer's eye position, for example to the eyes of the pilot of an aircraft in which the head-up display is provided, to superimpose the displayed visual information on the observer's view of an outside scene through the combiner, wherein the combiner comprises a transmission hologram which is substantially flat and disposed in a plane substantially orthogonal to an axis extending from the observer's eye position to the projection optics at a location substantially mid-way along that axis such that the distance between the projection optics and the transmission hologram is substantially the same as the distance between the transmission hologram and the observer's eye position.

By locating the transmission hologram substantially mid-way along said axis at a distance from the observer's eyes substantially the same (within ±15%) as the distance between the hologram and the projection optics, field aberrations, and particularly astigmatism, can be kept to a minimum.

The hologram can be generated by exposing a suitable substrate in a manner known per se with construction and reference beam foci at substantially (within ±15%) the same relative positions as the projection optics and the observer's eyes respectively, or by a method which generates diffracting regions of the same pattern as that made with constructing and reference beams so placed.

The hologram, particularly in the head-up display application, is preferably arranged to collimate the light deviated by transmission through the hologram so that the image of the displayed visual information seen by the observer appears at infinity. In this case said image plane is located substantially midway between the projection optics and the hologram.

Preferably there is provided means to support an observer to locate his head with his eyes at the required eye position.

Apparatus in accordance with the invention will now be described, by way of example, with reference to the accompanying drawing which schematically illustrates head-up display apparatus in the cockpit of a high acceleration aircraft.

The apparatus comprises a display source 1, for example in the form of a cathode ray tube, by which visual information can be displayed. Associated with the display source 1 are projection optics 2, of a form well known per se and comprising lens elements and possibly one or more mirror or prism elements, which produce an image of the visual information displayed in an image plane I.

Light from that image is received by a combiner in the form of a flat transmission hologram 3 which deviates the light and directs it in collimated form to the pilot's eye position E.

The pilot views the outside scene through the hologram 3 and through the cockpit windshield 4, and the holographic combiner 3 superimposes on his view of the outside scene the displayed visual information. The outside scene is usually distant so that light therefrom is effectively collimated. The light carrying the visual information is also collimated by the holographic combiner 3 so that the image of the visual information seen by the pilot is at infinity and he does not need to refocus his eyes to view that image.

The pilot is seated in a seat 5 including a headrest 6 which locates his head so as effectively to dictate his eye position E.

The hologram 3 is disposed in a plane orthogonal to an axis O extending from the pilot's eye position E to the projection optics 2 and located substantially midway along that axis. The axis O represents the axis of the system and the midway location of the hologram 3 is such that the distance 'k' between the projection optics 2 and the hologram 3 is equal to (within ±15%) the distance 'k' between the hologram 3 and the pilot-'eye position E. As will be well understood by those skilled in the art, the distance 'k' between the hologram 3 and the projection optics 2 is measured from the exit pupil of the projection optics.

The hologram 3 is generated by exposing a suitable substrate with construction and reference beam foci in substantially the same relative positions (within ±15%) as the projection optics 2 and the pilot's eye position E respectively, the construction and reference beams being such as to produce diffracting regions of a pattern which effects the required deviation and collimation by the resultant hologram. Alternatively, of course, the hologram could be produced by another method which generates diffracting regions of the same pattern as that made with construction and reference beams so placed and arranged.

With an arrangement as set forth above, field aberrations are reduced to a minimum. The most serious of these is astigmatism, which can be described as spherical aberration of the principal ray. To minimise this the principal rays from the projection lens to the combiner and then to the pilot's eyes must have small aberration at the final pupil. Thus the optimum holographic combiner design is one that gives minimum spherical aberration for object and image conjugates at the projection optics and pilot datum respectively.

In the analogous thin lens case, this requirement gives rise to an equiconvex lens when, and only when, the object and image distances are equal. Such an equiconvex lens has flat principal planes, and the hologram lens counterpart to this is also on a flat substrate. Thus, as described above, the holographic lens combiner, i.e. the hologram 3, is flat and the distance 'k' is substantially equal to the distance 'k'. The image plane I is located substantially midway between the projection optics 2 and the hologram 3 so as to achieve the required collimation of light from the image in that plane.

It will further be appreciated that the use of a transmission hologram 3 for the combiner is particularly suitable for a high acceleration aircraft cockpit where it is a requirement that the distance from the pilot's head to the nearest optical element must be kept as large as possible.

In this specification references to an observers view are to be deemed to include a view of a scene e.g. when the observer is flying in an aircraft or a view of an object e.g. when the aircraft is landing.

I claim:

1. Optical apparatus for superimposing displayed visual information on an observer's view comprising a display source, projection optics arranged to produce in an image plane an image of visual information displayed by the display source, and a transmission hologram arranged to receive light from that image and deviate such light towards the observer's eye position, while the observer is looking through the transmission hologram, wherein the transmission hologram is substantially flat and is disposed in a plane substantially orthogonal to an axis extending from the observer's eye position to the projection optics at a location substantially midway along that axis such that the distance between the projection optics and the transmission hologram is substantially the same as the distance between the transmission hologram and the observer's eye position.

2. Head-up display apparatus comprising a display source, projection optics arranged to produce in an image plane an image of visual information displayed by the display source, and a combiner arranged to receive light from that image and direct such light to an observer's eye position to superimpose the displayed visual information on the observer's view of the outside through the combiner, wherein the combiner comprises a transmission hologram which is substantially flat and disposed in a plane substantially orthogonal to an axis extending from the observer's eye position to the projection optics at a location substantially mid-way along that axis such that the distance between the projection optics and the transmission hologram is substantially the same as the distance between the transmission hologram and the observer's eye position.

3. Apparatus according to claim 1 or claim 2 wherein said image plane is located substantially mid-way between the projection optics and the transmission hologram whereby the hologram collimates the light deviated by transmission through the hologram so that the image of the displayed visual information seen by the observer appears at infinity.

4. Apparatus according to claim 1 or claim 2 including means to locate an observer's head with his eyes at the required eye position.

5. Apparatus according to claim 3 including means to locate an observer's head with his eyes at the required eye position.

* * * * *

UNITED STATES PATENT AND TRADEMARK OFFICE
CERTIFICATE OF CORRECTION

PATENT NO. : 4,261,635
DATED : April 14, 1981
INVENTOR(S) : Michael H. Freeman

It is certified that error appears in the above-identified patent and that said Letters Patent are hereby corrected as shown below:

Col. 1, line 23, after "lens" insert --through--.

Col. 3, lines 2-3, delete "pilot-'eye" and substitute therefor --pilot's eye--.

Signed and Sealed this

Twentieth Day of November 1984

[SEAL]

Attest:

GERALD J. MOSSINGHOFF

Attesting Officer

Commissioner of Patents and Trademarks